United States Patent [19]

Kuge et al.

[11] 4,237,592

[45] Dec. 9, 1980

[54] ELASTIC ROLLER FOR IMAGE FORMING APPARATUS

[75] Inventors: Tsukasa Kuge, Tokyo; Tsuyoshi Watanabe, Kawasaki; Toru Matsumoto, Tokyo, all of Japan

[73] Assignee: Canon Kabushiki Kaisha, Tokyo, Japan

[21] Appl. No.: 912,068

[22] Filed: Jun. 5, 1978

[30] Foreign Application Priority Data

Jun. 10, 1977 [JP] Japan ..... 52-68639

[51] Int. Cl.³ ..... B60B 7/00

[52] U.S. Cl. ..... 29/119; 15/230.11

[58] Field of Search ..... 29/116 R, 119, 131; 15/230.11, 244 A; 118/651, 652, 661; 401/197, 205, 208

[56] References Cited

U.S. PATENT DOCUMENTS

| | | | |
|---|---|---|---|
| 1,749,156 | 3/1930 | Pflimlin | 29/131 X |
| 2,704,392 | 3/1955 | Schultz | 29/120 X |
| 2,708,763 | 5/1955 | Jacoby | 29/131 X |
| 3,363,276 | 1/1968 | Thomas | 15/230.11 X |
| 3,452,414 | 7/1969 | Schiel | 29/119 |
| 3,588,264 | 6/1971 | Mallindine | 15/230.11 |

FOREIGN PATENT DOCUMENTS

| | | | |
|---|---|---|---|
| 52-55644 | 5/1977 | Japan | 29/131 |

*Primary Examiner*—Wayne L. Shedd

*Attorney, Agent, or Firm*—Fitzpatrick, Cella, Harper & Scinto

[57] ABSTRACT

An elastic roller for use in an image forming apparatus comprises a rigid shaft member, an internal layer provided around said shaft member with a determined thickness and consisting of a porous elastic member containing therein pores for holding liquid, and an external layer covering said internal layer and consisting of a flexible liquid-permeating member provided with a number of through holes, said roller being provided with a means for applying a tension to said external layer in the axial direction of said roller.

3 Claims, 19 Drawing Figures

ELASTIC ROLLER FOR IMAGE FORMING APPARATUS

BACKGROUND OF THE INVENTION

1. Field of the Invention

The present invention relates to an elastic roller for use in an image forming apparatus, and more particularly to an elastic roller capable of performing liquid squeezing and absorbing functions at the same time and adapted for use in a device involving a liquid such a liquid developer or a cleaning liquid in an image forming process.

In the field of image forming technologies such as electrophotography, electrostatic printing and electrostatic recording, there are already known various processes for developing, namely rendering visible, an electric latent image formed on a latent image carrier such as a so-called photosensitive member utilizing a photoconductive material or an electrostatic recording material. Such image visualization or development is generally achieved by applying particles of an electroscopic material or developer (generally called toner) selectively attracted or repelled by the electrostatic charge of said latent image onto a surface carrying said latent image thereon, although the details may differ according to whether a direct development or a reversal development is desired. In case of direct development the developer particles are deposited in the areas of latent image while in case of reversal development the developer particles are deposited outside said areas.

Among such developing processes, there are well known a dry development utilizing a developer consisting of dry powder and a wet development utilizing a liquid developer in which toner particles are dispersed in a liquid. Particularly, the latter liquid development is frequently employed in a simpler image forming apparatus because of the relatively simple mechanism required in comparison with the mechanism required for dry development and also because liquid development involves fewer drawbacks such as scattering of developer. In summary said liquid development comprises bringing a so-called liquid developer, including toner particles dispersed in an insulating carrier liquid of a volume resistivity higher than $10^{10}$ Ωcm, and of a dielectric constant smaller than 3, for example a paraffinic hydrocarbon, into contact with a latent image holding surface whereby said toner particles in said carrier liquid are attracted by and deposited on the electrostatic latent image on said surface to render said latent image visible. In apparatus utilizing such liquid development the use of elastic rollers has been quite common in the developing section, squeezing section, cleaning section etc., thereof.

2. Description of the Prior Art

As an example of such elastic roller applicable for the above-mentioned purposes, there is disclosed in the Japanese Laid-Open Patent Sho-52/55644 an elastic roller consisting of a sponge layer containing a continuous liquid-holding space therein, periphery of which is covered for example with a flexible liquid-permeating net. Such roller is capable of providing a desirable nip width in rotation under pressure contact with a rigid surface of a photosensitive element or an insulating element, and of squeezing out a liquid contained therein or absorbing a liquid according to the elastic deformation thereof. Such roller, therefore, is considered well suited for the liquid-handling purposes, for example in the developing or cleaning section.

However, such roller provided with a net-shaped external layer on the surface thereof, probably due to a difference in flexibility or hardness between the internal and external layers, tends to develop wrinkles in said external layer or net during the use of such roller, namely upon pressure contact with a rigid surface. Such wrinkle formation has proved to be particularly marked in the end portions of said roller. Also the structure of said net at the roller end is important. If the net end is exposed on the roll end, fibers of said net become gradually loose from the end portion of net to deteriorate the proper function of the roller and to render impossible uniform squeezing and absorbing effect over the entire width of the roller. Such an elastic roller, when employed in the developing step, will result in an uneven development according to the surfacial wrinkles or to the uneven pressure along the axis thereof, and, when employed for removing excessive liquid developer, will result in uneven liquid squeezing. Further, as a cleaning roller it will result in uneven cleaning which in turn leads to uneven charging in the succeeding electrostatic charging step.

SUMMARY OF THE INVENTION

A principal object of the present invention is to provide an elastic roller not associated with the drawbacks of conventional elastic rollers and adapted for general use in image forming apparatus utilizing liquid developer.

Another object of the present invention is to provide an elastic roller adapted for use in image forming apparatus and capable of maintaining a uniform contact pressure at the nip and allowing satisfactory liquid movement (absorbing and squeezing) at the contact area while retaining surface flexibility.

A still further object of the present invention is to provide an elastic roller for image forming apparatus neither developing nor increasing the surface wrinkles even if the peripheral speed thereof does not perfectly coincide with the speed of a rigid member in contact with said roller, if the contact pressure therebetween is not uniform or if the advancing direction of said roller does not coincide with that of said rigid member in the contact portion.

In the present invention, the above-mentioned objects are achieved by an elastic roller comprising a rigid shaft member, an internal layer provided around said shaft member with a determined thickness and consisting of a porous elastic member containing therein a space for holding liquid, and an external layer covering said interval layer and consisting of a liquid-permeating flexible member provided with a plurality of through holes, said roller being provided with a means for applying a tension to said external layer in the axial direction of said roller.

DESCRIPTION OF THE PREFERRED EMBODIMENTS

According to the present invention, in an elastic roller comprising a rigid shaft member, an internal layer of a pre-determined thickness provided around said shaft member and consisting of a porous elastic member containing therein pores for holding liquid and an external layer covering said internal layer and consisting of a flexible liquid-permeating member provided with a plurality of through holes, the wrinkle formation on the periphery surface of the roller can be prevented by applying a tension to said external layer in the axial direction of said roller.

Figure 1:
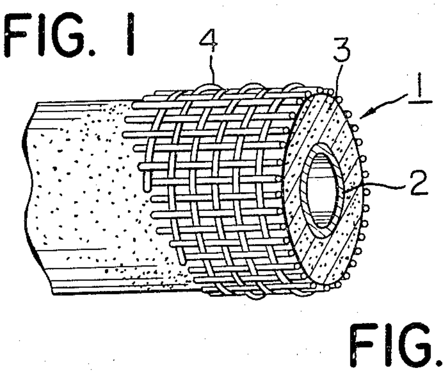
FIGS. 1 and 2 are schematic perspective views of components of the elastic roller of the present invention.
Figure 2:
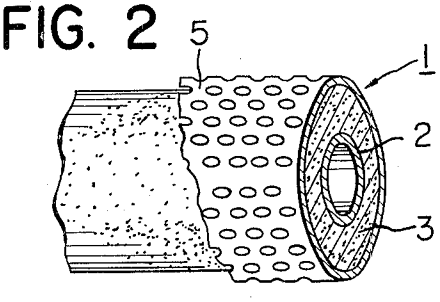

FIGS. 1 and 2 show a part of the composition of the elastic roller of the present invention essentially consisting of a central roller functioning as a rotating shaft, a porous elastic member provided therearound, and an external flexible member provided with a number of through holes.

Referring to FIG. 1, the elastic roller 1 comprises a central roller 2 composed of a rigid material such as a metal or a hard synthetic resin, an elastic foam member 3 provided around said central roller 2 and composed for example of foamed polyurethane, and a netting 4 covering said foam member 3. Said foam member 3 is fixed on said central roller 3 while said netting 4 is formed into a seamless tube to cover said elastic form member 3. Said netting 4 is fixed on the peripheral surface of said elastic foam member 3 by repulsive force from the compressed state thereof. Upon rotation of said central roller 2, the foam member 3 and netting 4 rotate integrally therewith. Also said foam member 3 is capable of holding and permeating liquids and, due to elastically deformable continuous pores therein, is also capable of absorbing and squeezing out liquids. The surfacial netting 4 is composed of a flexible woven net of thin metal wires such as stainless steel wires, natural or synthetic fibers, the texture of which allows entry of exudation of liquid into or from said foam member 3. Thus the liquid impregnated in said elastic roller 1 is squeezed out through said texture from said foam member 3 when said roller is compressed, and, inversely, the liquid present on the surface of said netting 4 is absorbed into said foam member 3 through said texture when said foam member 3 recovers from the compressed state thereof. In an application, for example, for a developing roller for use in an electrophotographic copying apparatus, the above-mentioned external netting of the elastic roller should be provided with a texture of 60 to 400 mesh, more preferably of 180 to 300 mesh in order to avoid eventual trace of contact of said netting on the image to be obtained and also in consideration of the convenience of practical use. In the present embodiment, said netting may be composed of plain, twilled or satin weavings or pressure-deformed nets obtainable from such weavings. Furthermore, though the direction of the weft of the netting coincides with the axial direction of the roller in the embodiment shown in FIG. 1, it is also possible provide an aribitrary angle between said directions.

In addition to the foregoing embodiment, the present invention can be realized in various modifications. In the present invention, the external member of the elastic roller may be composed of any material that is provided with through holes connecting the interior and exterior thereof, is flexible in a direction perpendicular to the outermost surface coming in contact with another rigid surface, and retains permeability of said holes in case of such contact. Therefore said external member may also be composed, in addition to the netting as mentioned above, of a metal film or a plastic film provided with a number of perforations, as shown in FIG. 2, wherein 5 is a sleeve of such a film provided with circular perforations. Said perforations are not limited to circular shape but may also be of square, oval, mosaic shapes or combinations thereof. Furthermore the foam member 3 shown in FIGS. 1 and 2 is not necessarily of a single layer but may also be composed of plural layers.

Now the various embodiments of the present invention will be further explained in detail with respect to an application in an electrophotographic copying apparatus and with particular reference to the attached drawings, wherein like components are represented by like numbers. In said illustrated embodiments the external member of elastic roller is composed of a netting as shown in FIG. 1, but it is to be understood that such structure is employed simply for clarity of description and by no means limits the scope of the present invention.

Figure 3A:
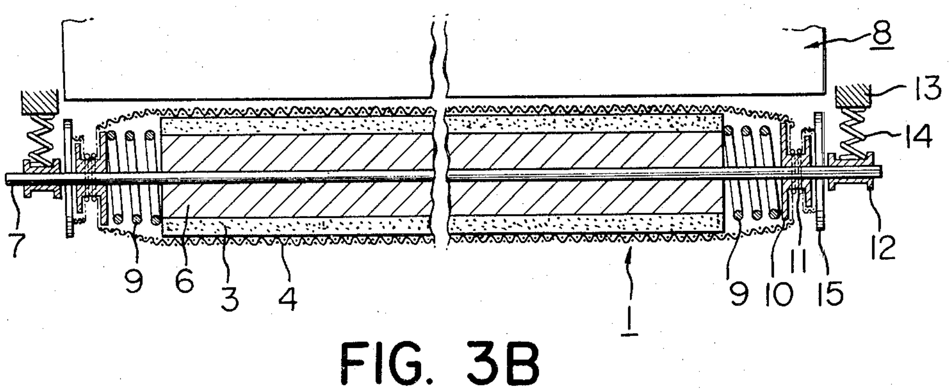
FIGS. 3A, 3B, 3C, 4A, 4B, 5A and 5B are schematic cross-sectional views of embodiments of the present invention.

Referring to FIG. 3A, the elastic foam member 3 covers and is adhered to the rigid shaft member 6 which is in turn fixed on a rotary shaft 7. Thus the elastic roller 1 is rotated by said rotary shaft 7 if it is externally driven or by a rotating photosensitive drum 8 in pressure contact therewith. A net sleeve 4 covers said elastic foam member 3 and is fixed, at both ends, by means of a thread or a belt-shaped member 11, onto a rigid movable member 10 movable along said shaft 7 under the pressure of a spring 9. On both ends of elastic roller 1 there are provided bearings 12 on which said shaft 7 is rotatably supported. Between said bearings 12 and supports 13 therefor there are provided springs 14 for maintaining said roller 1 in pressure contact with the photosensitive drum 8, though there is provided a spacing therebetween in the illustrations for the purpose of clarity. Between said bearings 12 and the rigid movable members 10 there are provided guide plates 15 for defining the amount of nip "1"$_1$ in the contact between the roller 1 and drum 8 as will later be shown in FIG. 6. The maximum diameter of said rigid movable members 10 is selected smaller than the diameter of said guide plates 15 in order to avoid eventual contact of said members 10 with said drum 8 when it is brought into pressure contact with the roller 1. FIG. 3A shows a case wherein there is a large friction between the external periphery of elastic foam member 3 and the internal periphery of net sleeve 4, said sleeve 4 being tensioned from both ends by the elastic force of springs 9 provided on both ends. By selecting the maximum diameter of rigid movable member 10 approximately equal to the internal diameter of said net sleeve 4, it is rendered possible to maintain the peripheral length thereof substantially constant over the entire length of roller 1 when said net sleeve 4 is placed under a tension.

Even when speed differences tend to develop in different portions of net sleeve 4 because of uneven peripheral length of elastic foam member 3 or uneven contact pressure thereof along the axial direction of roller 1 or because of a slight difference between the peripheral speeds of the photosensitive drum 8 and of the roller 1 or even opposite directions of movement thereof in the contact portion (i.e., rotating directions of the two are the same), the above-mentioned tension suppresses such tendency and prevents wrinkle formation. Also said tension helps the net sleeve to recover from local deformations when the pressure contact state is released.

Figure 3B:
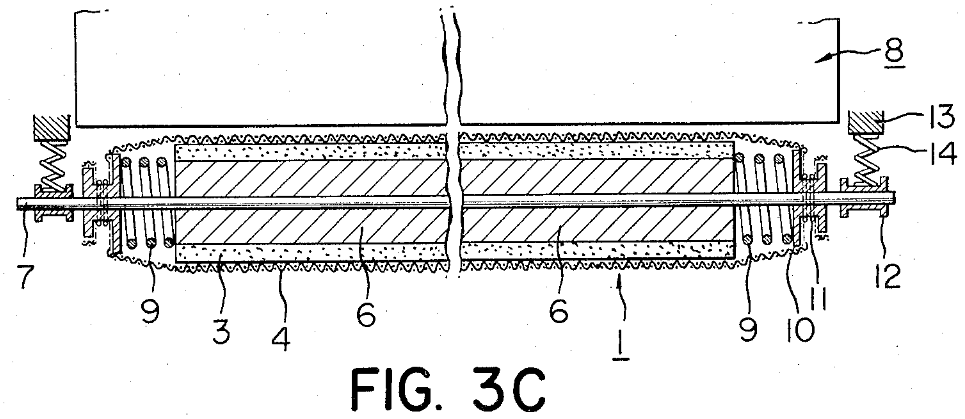

FIG. 3B shows a modified embodiment which is different from the foregoing embodiment shown in FIG. 3A in the absence of guide plates 15, and which is likewise free from development or increase of wrinkles during the use thereof.

Figure 3C:
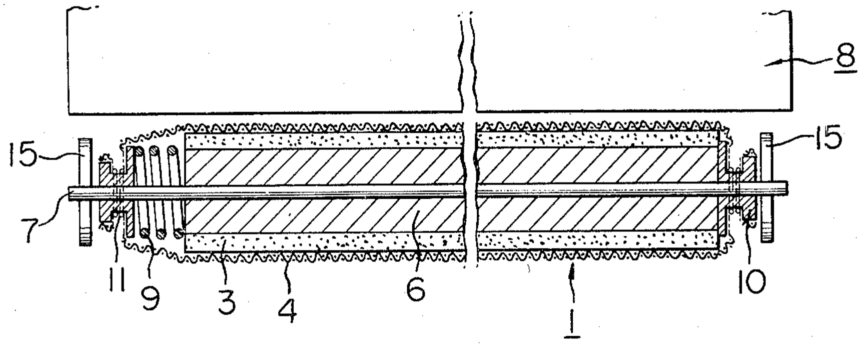

FIG. 3C shows an another modified embodiment which is different from the embodiment shown in FIG. 3A in that the means for applying a tension to the net sleeve 4 is provided only at one side of the roller 1, and which likewise show no wrinkle formation increase in the net sleeve 4.

Figure 4A:
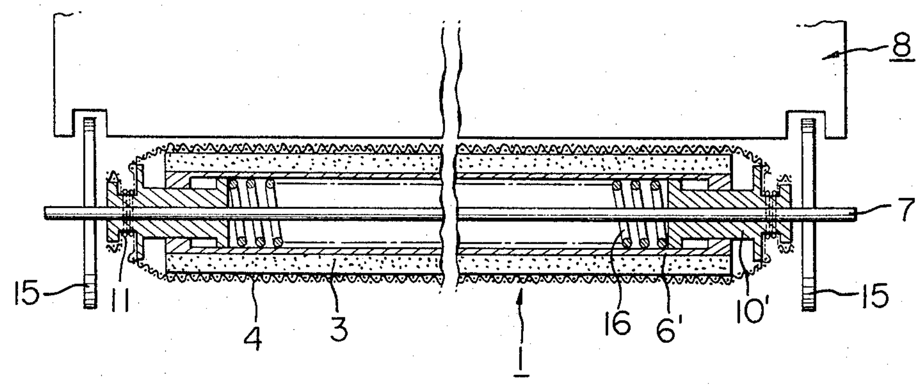

The embodiment shown in FIG. 4A is featured in that the tensions applied to both ends of net sleeve 4 are rendered mutually equal. Inside the rigid shaft member 6′ there is provided an elastic member such as a coil spring 16 to provide the rigid movable members 10′ on both ends with an equal outward pressure along the direction of the rotary shaft 7, the net sleeve 4 receiving said pressure and thus being constantly tensioned equally toward both ends.

Figure 4B:
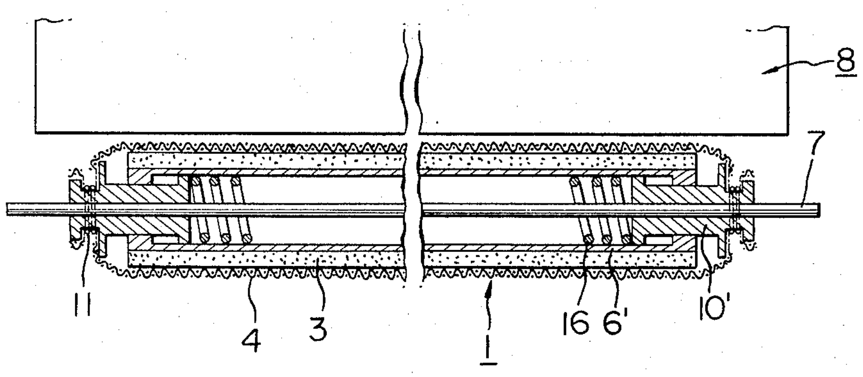

FIG. 4B shows a modified embodiment obtained by removing guide plates 15 from the embodiment shown in FIG. 4A. In the foregoing embodiments shown in FIGS. 3A, 3C and 4A, the nip width "1"$_1$ as defined in FIG. 6 is determined by the guide plates 15. In practice, however, because of the characteristics of elastic foam member 3, the peripherai length of roller 1 fluctuates along the axial direction thereof, so that the nip width "1"$_1$ in the contact between the drum 8 and roller 1 also is not constant along the axial direction. Such uneven nip width "1"$_1$ will result in an uneven development, though slight, in case of the use of roller 1 as a developing roller, and in an uneven squeezing in case of the use thereof as a squeezing roller for removing excessive liquid developer. Such drawback can be prevented by, as represented in FIG. 5A, selecting the maximum diameter of rigid movable members slightly larger than the diameter of roller 1 thereby rendering the diameter of roller 1, or peripheral length thereof, constant over the entire axial length of the roller.

Such elastic roller is capable, when brought into pressure contact with the photosensitive drum 8, of providing a uniform nip width "1"$_1$ over the entire width of said roller.

Figure 5A:
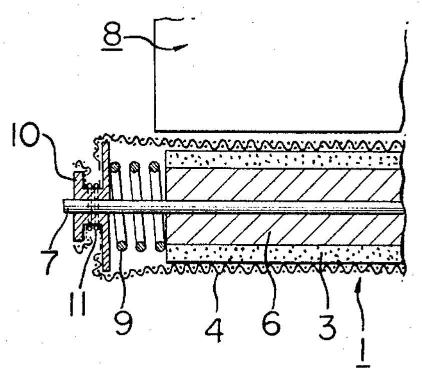
Figure 5B:
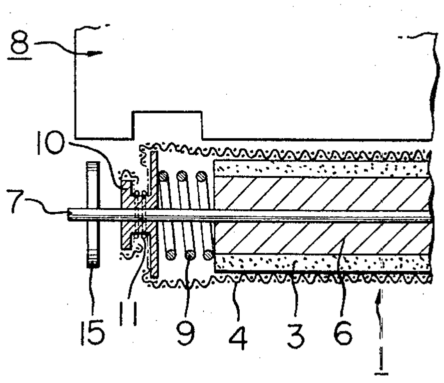
Figure 6:
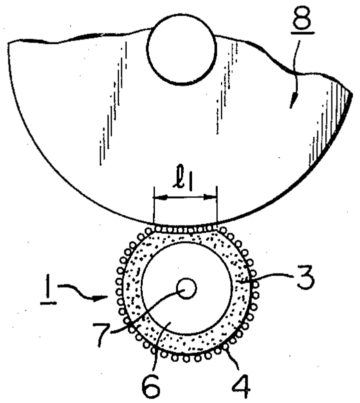
FIG. 6 is a lateral cross-sectional view schematically illustrating the pressure contact state between the elastic roller and the photosensitive drum.

FIG. 5B shows a modified embodiment which is different from the embodiment shown in FIG. 5A in the presence of guide plates 15, wherein a portion of the rigid movable members 10 of maximum diameter engages with a recessed portion provided on the photosensitive drum 8. In this case the amount of deformation of roller 1 upon pressure contact thereof is defined by the guide plates 15.

FIG. 6 is a schematic cross-sectional view illustrating a pressure contact state between the elastic roller 1 and the photosensitive drum 8 which contact with each other in an area of a so-called nip width "1"$_1$.

Figure 7:
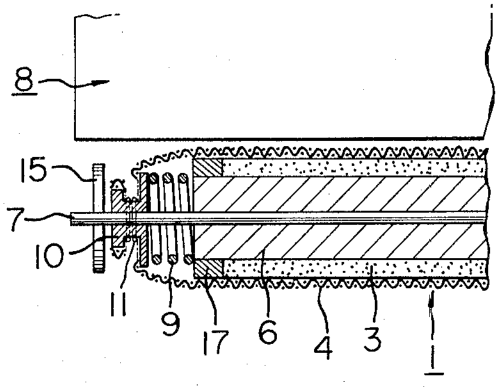
FIGS. 7 to 14 are schematic cross-sectional views of other embodiments of the present invention.

FIG. 7 shows an embodiment of the elastic roller provided more effectively with the advantages of the present invention, wherein, on both ends of roller 1, there are provided on the rigid shaft member 6 other elastic members 17 of a hardness higher than that of elastic foam member 3. When the net sleeve 4 is provided on the periphery thereof, the diameter of roller 1 is determined by the diameter of said elastic members 17 rather than by that of elastic foam member 3 and is thus substantially uniform over the entire width of roller 1, thus providing an axially uniform nip width when it is defined by the guide plates 15 upon pressure contact between the photosensitive drum 8 and roller 1. Said nip width "1"$_1$, or the degree of pressure contact, can be arbitrarily changed by the diameter of guide plates 15 and according to the purpose of roller 1. In the present embodiment the development and increase of wrinkles are prevented by the tension applied by the spring 9 to the net sleeve 4 while the peripheral length of roller 1 is maintained constant over the entire axial width thereof by the presence of elastic members 17, and the nip width "1"$_1$ is maintained constant by the guide plates 15.

It is also possible, in the embodiments shown in FIGS. 5A, 5B and 7, to make modification in such a manner as to apply a tension to the net sleeve 4 from only one end of the roller, and it is further possible in the embodiment of FIG. 7 to remove the guide plates 15. For the purpose of clarity, all the foregoing embodiments are illustrated in a state where the pressure contact between the photosensitive drum 8 and the roller 1 is released. Furthermore, in the foregoing embodiments, it is preferable to use an elastic member for fixing the end of said net sleeve 4, namely in the contact portion between the rigid movable member 10 and said net sleeve 4 in order to achieve secure fixation thereof.

In the following there will be shown still other embodiments of the present invention, wherein the explanations and drawings are concentrated on the means of applying tension to the netting of the surface of elastic roller.

Figure 8:
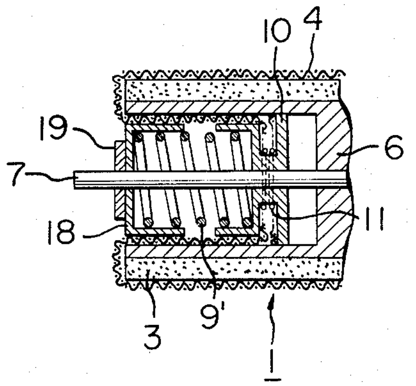

The embodiment shown in FIG. 8 is provided, as said means, with a coil spring 9′ inside the rigid shaft member 6 of roller 1. On said shaft member 6 there is adhered an elastic foam member 3 which is in turn covered by a net sleeve 4 which is fixed, by means of a fixing member 11 such as a thread or a belt, to rigid movable members 10 accommodated inside said rigid shaft member 6 and movable along the rotary shaft 7. Other rigid movable members 18 similarly provided inside said shaft member 6 and movable along the rotary shaft 7 are retained within the roller 1 by means of stopper members 19. Said coil springs 9′ are supported between said rigid movable members 10 and other rigid movable members 18. The elastic force of said coil springs 9′ solely acts in the direction of said members 10 since said members 18 are fixedly retained by the stoppers 19. Thus the inward movement of said members 10 applies a tension to the net sleeve 4. The present embodiment is advantageous in a shortened total length of roller and in an accordingly smaller dimension of the apparatus employing such roller, because of the tension means being incorporated inside the rigid shaft member 6 of roller 1.

Figure 9:
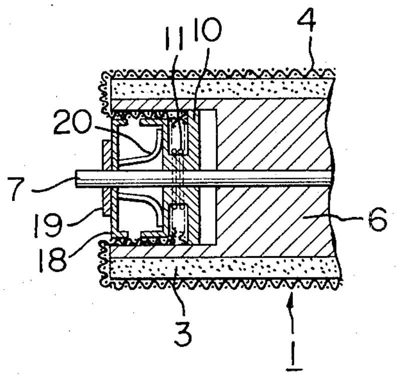

FIG. 9 shows a modified embodiment wherein the coil spring in the embodiment of FIG. 8 is replaced by a plate spring 20, which allows to reduction of the distance between the rigid movable members 10 and 18.

Figure 10:
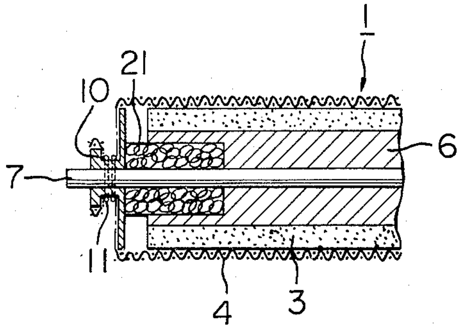

FIG. 10 shows an embodiment wherein said tension means is composed of an organic elastic material 21 such as rubber or sponge. The net sleeve 4 is fixed, by means of fixing members 11, such as a thread or a belt, to the rigid movable members 10 movable along the rotary shaft 7. An end of said elastic member 12 is fixed inside the rigid shaft member 6, so that the rigid movable members 10 receive an elastic force from said elastic member 21 to move toward the ends of roller 1 along the rotary shaft 7 thereby giving a tension to the net sleeve 4.

Figure 11A:
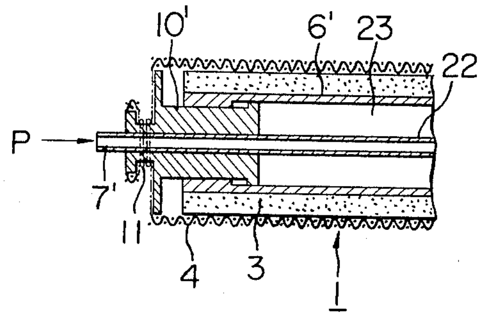
Figure 11B:
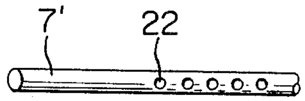

In the embodiment shown in FIG. 11A, the tension means to the net sleeve 4 is composed of an enclosed chamber formed in the shaft member 6′, interior of which can be pressurized by means for example of air, oil or water. The net sleeve is fixed, by means of fixing members 11 such as a thread or a belt, to rigid movable members 10′ movable along the rotary shaft 7′, which is of pipe-shaped and is provided with openings 22 as shown in FIG. 1B located inside the hollow shaft member 6′ to communicate the interior of the shaft 7′ with the interior 23 of shaft member 6′. Air, oil or water is pressed into the interior 23 from the direction of arrow P and through said openings 22. The pressure of said air, oil or water filled into said interior 23 causes the displacement of movable members 10′ along the shaft 7′ toward the ends thereof thereby applying a tension to the net sleeve 4.

Figure 12:
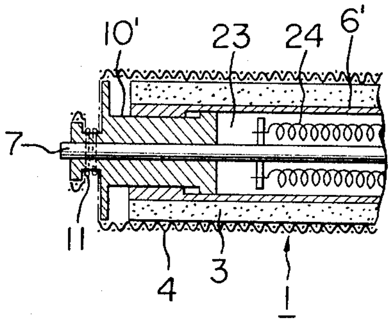

In the embodiment shown in FIG. 12 the air enclosed in the chamber 23 is expanded by heating with a heater 24 to apply a tension to the net sleeve 4, which is fixed, by means of fixing members 11 such a thread or a belt, to the rigid movable members 10′ movable along the shaft 7. A heater 24 is mounted on a support 25 provided in the internal chamber 23 of the rigid shaft member 6′ and heats the air therein to cause an expansion thereof, causing an outward displacement of the movable members 10′ toward the ends of shaft 7 and thus applying a tension to the net sleeve 4 fixed to said movable members 10′.

In the embodiments shown in FIGS. 11A and 12 the tension on the net sleeve 4 can be removed when the roller is not in operation. This can be achieved by releasing the pressure to the air, oil or water in case of FIG. 11A and by interrupting the function of said heater in case of FIG. 12. Maintaining the net sleeve 4 under tension not constantly but only when the roller 1 is in operation elongates the service life of said net sleeve 4 and thus the roller 1 itself.

Figure 13:
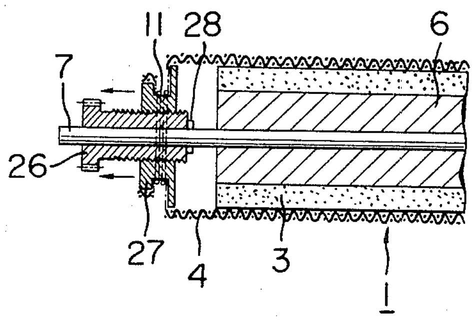

In the embodiment shown in FIG. 13 the tension applied to the net sleeve 4 is obtained by a screw means. The net sleeve 4 is fixed, by means of fixing members 11 such as a thread of a belt, to rigid movable members 27 displaceable on screw means 26 rotatable around the rotary shaft 7. Said screw means 26, though not movable toward the roller by the presence of stopper members 28, are rotatable around the shaft 7 and are provided with a male thread which engages with a female thread on the rigid movable members 27, so that a rotation of said screw 26 causes a displacement of movable members 27 in the direction of arrows, thereby applying a tension to the net sleeve 4.

Figure 14:
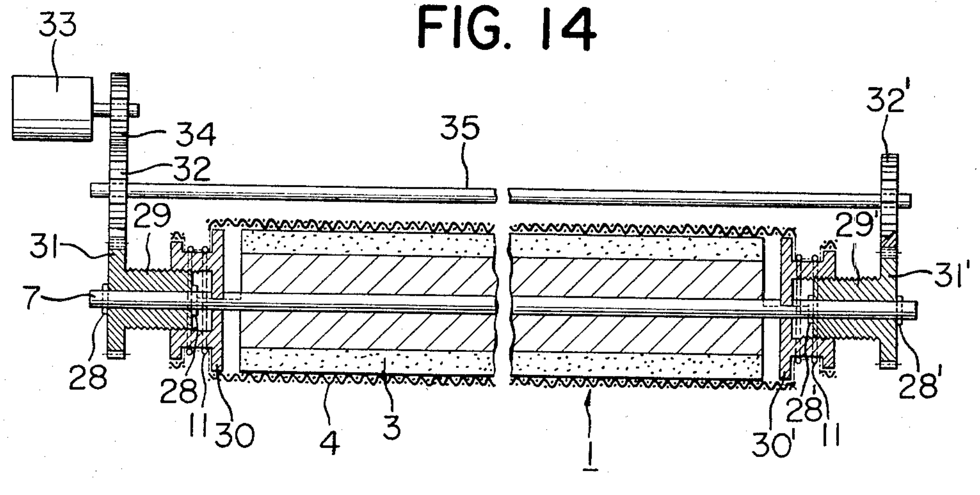

FIG. 14 shows a modification utilizing a tension means substantially the same as that shown in FIG. 13 and further utilizing automatically an initial drive force for applying tension to the net sleeve 4. The net sleeve 4 is fixed, by means of fixing members 11 such as a thread or a belt, to rigid movable members 30, 30′ movable over rigid screw members 29, 29′ which are retained in the shaft 7 by the stoppers 28, 28′ and of which maximum diameter portions 31, 31′ respectively engage with gears 32, 32′. While said screw members 29, 29′ are rotatable around the shaft 7, said movable members 30, 30′ are not rotatable, though they are movable along said shaft 7. The screw members 29, 29′ and movable members 30, 30′ are provided, in the mutually contacting surfaces thereof, with screw threads the pitch of which on 29 is opposite to that on 29′. A motor 33 rotates, through a gear 34, gear 32, a shaft 35 and a gear 32′, the screw members 29, 29′ which cause the displacement of movable members 30, 30′ towards the both ends of roller 1. The net sleeve 4 is thus placed under a tension, and the movable members 30, 30′ terminate axial displacement and start rotation with said screw members 29, 29′ when the sleeve is sufficiently tensioned.

In the embodiments shown in FIGS. 8–14 is it also possible, though not shown, to partly replace the elastic foam member 3 by elastic members 17 on the end portions as shown in FIG. 7 thereby rendering the nip width uniform over the entire width of roller and effectively preventing the wrinkle formation. Also the tension means may be provided either on one end or on both ends of the roller according to the necessity.

In the foregoing embodiments the elastic foam member 3 can be composed, for example of various rubber foams or plastic foams such as polyurethane foam. Also the net sleeve 4 can be composed of polyamide (Nylon), polyester (Tetoron), silk, cotton, or fine steel wire. Particularly preferred is plain fabric of 100–450 mesh. Also the elastic member 17 can be composed of polyurethane rubber, silicon rubber, nitrile rubber, butyl rubber, acryl rubber, fluorated rubber, neoprene, chloroprene etc.

The elastic roller of the present invention detailedly explained in the foregoing can be effectively applicable, in image forming apparatus utilizing liquid developer, as the means of development, liquid squeezing, leak stopping and cleaning with satisfactory performance.

What we claim is:

1. An elastic roller for use in an image forming apparatus comprising: a rotary shaft, a rigid shaft member surrounding a portion of the length of said rotary shaft and fixed thereto, said shaft member being formed with an axially extending recess in at least one of its ends, an internal layer provided around said shaft member and consisting of a porous elastic member having pores for holding liquid, and external layer covering said internal layer and consisting of a flexible, liquid permeable member having a number of through holes, inner and outer rigid members mounted for axial movement on at least one end of said rotary shaft in at least one of said recesses, resilient means urging said inner and outer members in at least one of said recesses axially apart, stop means limiting axial movement of the outer rigid member in a direction outwardly along said rotary shaft, said liquid permeable member extending into said at least one of said recesses, and means securing an end of said liquid permeable member to the inner one of said rigid members in said at least one of said recesses.

2. An elastic roller according to claim 1 wherein said resilient means comprises a coil spring.

3. An elastic roller according to claim 1 wherein said resilient means comprises a plate spring.

* * * * *